July 20, 1926.
W. L. MERRILL
MOTOR DRIVE
Filed Oct. 20, 1924
1,593,343
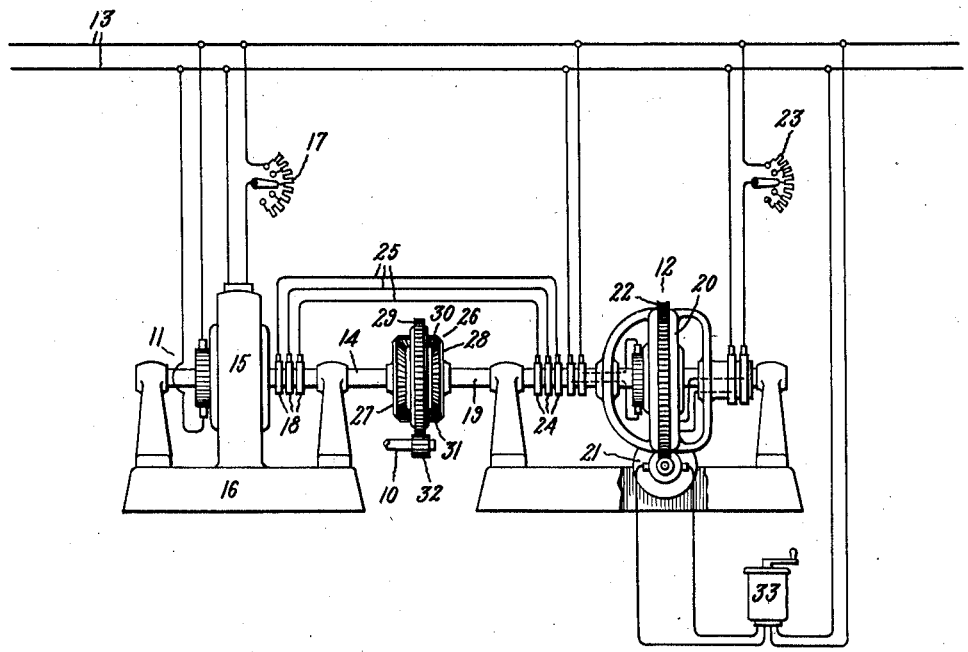
Inventor
Wilbur L. Merrill
by
His Attorney Patented July 20, 1926.

1,593,343

UNITED STATES PATENT OFFICE.

WILBUR L. MERRILL, OF SCHENECTADY, NEW YORK, ASSIGNOR TO GENERAL ELECTRIC COMPANY, A CORPORATION OF NEW YORK.

MOTOR DRIVE.

Application filed October 20, 1924. Serial No. 744,569.

One of the objects of the invention is the provision of a motor drive whereby a great nicety of speed variation of the driven machine may be obtained.

A further object of the invention is the provision of a motor drive whereby a comparatively low speed of the driven machine may be obtained with a uniformity of rotation of the driving element and a nicety of speed variation.

In carrying the invention into effect in the form which I now regard as the preferred form, the driven machine is operated from the ring gear of a differential gear, one element of the differential being driven by one direct current motor and the other element being driven by another direct current motor. Electrical connections interconnect corresponding armature taps of the direct current motors so that as long as the field frame structures of the motors remain stationary, the connections form a synchronizing link between the motors to maintain a predetermined speed relation between the motors. By rotating the field frame structure of one of the motors in a predetermined direction and at a predetermined speed this motor will run at a different speed than the other motor so that this speed difference in the motors will effect a corresponding direction of operation and speed of the driven machine through the differential gearing connecting the motors and the driven machine. Variations due to variations of voltage, load and heating will have comparatively little effect on the speed of the driven machine. The driven machine may be operated at very low speed which may be maintained substantially constant.

For a better understanding of the invention, reference is had to the accompanying drawing which shows in very simplified form a drive for carrying into effect the said objects of the invention and other objects of the invention as will be either explained fully hereinafter or as will be apparent to those skilled in the art.

Referring to the drawing, the machine to be driven at a substantially constant speed is not shown on the drawing, since the invention is applicable to any type of machine to be so driven. It is regarded as sufficient to obtain an understanding of the invention that merely the shaft 10 of the machine to be driven be shown. This shaft is driven by means of the electric motors 11 and 12 which are preferably of the direct current type arranged to receive power from the direct current supply circuit 13. The electric motor 11 is of the customary type having an armature mounted on a shaft 14 and a field magnet frame 15 which is secured to the base 16. The field magnet windings of this motor are supplied with energy from the supply circuit 13 through the variable rheostat 17 which is provided for varying the energization of the motor field winding and thus regulating the speed of the shaft 14. The motor 11 is provided with slip rings 18 which are connected to equipotential points in the motor armature windings and it will be understood that when the motor is in operation alternating current may be taken from the slip rings 18, the frequency of this current being determined by the speed of the motor.

The motor 12 is of the type having an armature mounted on the shaft 19 and a field frame member 20 which is mounted so as to be capable of rotation with respect to the shaft 19. The field frame member 20 is arranged to be rotated with respect to the shaft 19 by means of the electric motor 21 which is connected to the gear 22 on the periphery of the field frame structure 20 and by means of a suitable pinion on the armature shaft of the motor 21. The field magnet windings of the motor 12 are energized from the supply circuit 13 through the adjustable rheostat 23, which is provided for varying the energization of the field magnet windings of this motor and thus varying the speed of the shaft 19. The armature of this motor receives energy from the supply circuit 13. The slip rings 24 are connected to suitable equipotential points in the armature windings of the motor 12 so that when this motor is in operation an alternating current may be taken from the slip rings 24, and the frequency of this current will vary in accordance with the speed relation between the field frame member 20 and the armature of the motor. The synchronizing electrical connections 25 form an interlocking link between the slip rings 18 of the motor 11 and the slip rings 24 of the motor 12 so as to automatically maintain an established speed relation between the motors 11 and 12. A differential gear arrangement 26 is interposed between the shaft 14 of the motor 11 and the shaft 19 of the motor 12. This differential gear comprises a beveled gear 27 on the motor shaft 14, a beveled gear 28 on the motor shaft 19, a ring gear 29 interposed between the two beveled gears 27 and 28 and operated through the beveled gear pinions 30 and 31, in a manner which will be well understood, since this differential gear arrangement is a common form of mechanical movement. The ring gear 29 is connected to the pinion 32 on the shaft 10 of the machine or other apparatus to be driven at a comparatively low and constant speed.

The operation of my invention as thus constructed and arranged is as follows:—

Let it be assumed that the field frame 20 of the electric motor is held stationary; in other words, the regulating motor 21 is not in operation, and that the motors 11 and 12 are energized from the supply circuit 13 and that the field regulating rheostats 17 and 23 are adjusted so that the motors 11 and 12 operate at the same speed. This speed relation will be automatically maintained through the synchronizing connections 25 interposed between the armatures of these two motors. The shaft 10 of the device to be driven will be maintained stationary since the operation of this shaft depends upon a difference in speed between the motor shaft 14 and the motor shaft 19. Assume now that it is desired to operate the shaft 10 in a particular direction at a very low speed and that the speed of this shaft shall be maintained substantially constant at a value which may be predetermined. The reversing controller 33 for the motor 21 will now be operated so as to rotate the field frame 20 of the motor 12 in such a direction that the shaft 10 will operate in the predetermined direction. By reason of the fact that there is a comparatively large gear reduction between the motor 21 and the field frame 20, the field frame may be rotated at a comparatively low speed. Rotating the field frame 20 of the motor 12 will vary the speed of this motor, but the frequency of the current supplied to or taken from the synchronizing connections 25 between the motors 11 and 12 will not be altered, since the relative rotation of the field and armature members of the motor 12 will remain at the initial predetermined value. The speed relation between the motors 11 and 12 may thus be varied at will by varying the speed of rotation of the field member 12, and this speed relation will then be automatically maintained at the predetermined value through the synchronizing connections 25. The difference in speeds between the shafts 14 and the shafts 19 will be transmitted to the shaft 10 through the differential gearing 26, and it will be observed that this differential gearing together with the pinion 32 on the shaft 10 form a comparatively large gear reduction unit so that the shaft 10 may be operated at a very low speed. It will also be observed that a very substantial amount of power is always available for operating this shaft at the desired low uniform speed. Variations in the voltage of the supply circuit 13, variations due to the heating of the fields of the motors 11 and 12 and other variations which ordinarily tend to produce material variations in the speed of the driven machine, will have no appreciable effect on the speed of the shaft 10, by reason of the fact that the motors 11 and 12 are connected through the synchronizing tie-in connections 25 and by reason of the fact that the speed reduction between the shaft 10 and the driving units is comparatively large. It will also be observed that variations in the speed of the motor 21 for a particular setting of the controller 33 will have no appreciable influence on the speed of the shaft 10, by reason of the fact that the gear reduction between the motor 21 and the field frame 20 is quite large.

The shaft 10 may be operated in either direction as desired, determined by the direction of operation of the motor 21. The direction of operation of the motor 21 and the speed of this motor may be determined at will by means of the controller 33.

In accordance with the provision of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. Means for driving a shaft comprising two direct current motors having respectively field frame and armature members, one of said motors having a field frame member arranged to rotate, means operated responsively to the relative speeds of said armature members for operating the said shaft, means for rotating the said field frame member of one of said motors, and synchronizing electrical connections between the armature of said motors through which the speed relation of said motors determined by the speed of rotation of said field frame member is automatically maintained.

2. Means for driving a shaft comprising two direct current motors having respectively field frame and armature members with the windings of the armature members of the motors interconnected through synchronizing connections and one of said motors arranged so that the field frame member thereof is rotatable, means operated responsively to the relative speeds of said armature members for operating said shaft, and means for rotating the said field frame of one of said motors for varying the speed of said shaft.

3. Means for driving a shaft comprising two direct current motors having their armatures electrically interconnected through alternating current synchronizing connections, differential gearing interposed between the driving elements of said motors, the said gearing having a ring gear which operates the said shaft and is arranged to run at a speed and in a direction determined by the speed relation of the driving elements of said motors, and means for rotating the field frame member of one of said motors to vary the speed of the said shaft and alter the direction of operation thereof.

In witness whereof, I have hereunto set my hand this 18th day of October, 1924.

WILBUR L. MERRILL.